US009001800B2

(12) United States Patent
Habetha et al.

(10) Patent No.: US 9,001,800 B2
(45) Date of Patent: Apr. 7, 2015

(54) SYSTEM AND METHOD FOR AN ULTRA WIDE-BAND MEDIUM ACCESS CONTROL DISTRIBUTED RESERVATION PROTOCOL

(75) Inventors: Joerg Habetha, Aachen (DE); Guido Hiertz, Cologne (DE); Javier Del Prado Pavon, Ossining, NY (US); Kiran Challapali, New City, NY (US); Sai Shankar Nandagopalan, Tarrytown, NY (US)

(73) Assignee: Koninklijke Philips N.V., Eindhoven (NL)

( * ) Notice: Subject to any disclaimer, the term of this patent is extended or adjusted under 35 U.S.C. 154(b) by 2690 days.

(21) Appl. No.: 10/597,543

(22) PCT Filed: Feb. 3, 2005

(86) PCT No.: PCT/IB2005/050461
§ 371 (c)(1),
(2), (4) Date: Jul. 28, 2006

(87) PCT Pub. No.: WO2005/076544
PCT Pub. Date: Aug. 18, 2005

(65) Prior Publication Data
US 2008/0259895 A1 Oct. 23, 2008

Related U.S. Application Data

(60) Provisional application No. 60/542,529, filed on Feb. 6, 2004, provisional application No. 60/614,719, filed on Sep. 30, 2004.

(51) Int. Cl.
*H04W 4/00* (2009.01)
*H04W 74/04* (2009.01)
(Continued)

(52) U.S. Cl.
CPC .............. *H04W 74/04* (2013.01); *H04W 84/12* (2013.01); *H04W 28/26* (2013.01); *H04W 72/0446* (2013.01); *H04B 1/7163* (2013.01); *H04W 74/002* (2013.01); *H04W 84/18* (2013.01)

(58) Field of Classification Search
CPC ..... H04W 84/18; H04W 84/12; H04W 74/04; H04W 74/002; H04W 28/26; H04W 72/0446; H04W 74/0816; H04W 8/005; H04W 72/0406
USPC ......... 370/230, 252, 254, 255, 321, 322, 329, 370/330, 336, 337, 338, 346, 347, 348, 350, 370/401, 431, 442, 443, 445, 447, 448, 458, 370/459, 328, 352; 709/225, 226, 227, 228, 709/229, 230; 455/450, 451, 452.1, 452.2, 455/41.2, 509, 515, 63.1
See application file for complete search history.

(56) References Cited

U.S. PATENT DOCUMENTS 5,297,144 A * 3/1994 Gilbert et al. ................. 370/346
6,496,499 B1 * 12/2002 Hamilton et al. ............. 370/348
(Continued)

FOREIGN PATENT DOCUMENTS

WO     WO2004114598 A1     12/2004

OTHER PUBLICATIONS

Chenxi Zhu and M.S. Corson, A Five-Phase Reservation Protocol (FPRP) for Mobile Ad Hoc Networks, Aug. 2001, Kluwer Academic Publishers, vol. 7, Issue 4, pp. 371-384.*
(Continued)

*Primary Examiner* — Olumide T Ajibade Akonai
(74) *Attorney, Agent, or Firm* — Larry Liberchuk

(57) ABSTRACT

A system (300), apparatus (301), and method are provided for decentralized medium access control comprising an enhanced protocol for UWB MAC that includes a distributed reservation protocol (DRP) for distributed reservation of the medium (310). The invention also relates to any wireless system (300) that uses a MAC protocol comprising a distributed reservation protocol. The method comprises devices (301) announcing medium reservations in beacons (400) and devices (301) that receive such announcements respecting the reservations.

36 Claims, 13 Drawing Sheets

(51) Int. Cl.
  *H04W 28/26* (2009.01)
  *H04W 84/12* (2009.01)
  *H04W 72/04* (2009.01)
  *H04B 1/7163* (2011.01)
  *H04W 74/00* (2009.01)
  *H04W 84/18* (2009.01)

(56) References Cited

U.S. PATENT DOCUMENTS

| | | | |
|---|---|---|---|
| 6,665,311 B2* | 12/2003 | Kondylis et al. | 370/462 |
| 7,039,032 B1* | 5/2006 | Ho et al. | 370/338 |
| 7,068,633 B1* | 6/2006 | Ho | 370/338 |
| 7,164,671 B2* | 1/2007 | del Prado et al. | 370/338 |
| 7,245,947 B2* | 7/2007 | Salokannel et al. | 455/574 |
| 7,280,517 B2* | 10/2007 | Benveniste | 370/338 |
| 7,496,081 B2* | 2/2009 | Salokannel et al. | 370/348 |
| 2003/0063619 A1* | 4/2003 | Montano et al. | 370/443 |
| 2004/0053621 A1* | 3/2004 | Sugaya | 455/450 |
| 2005/0036475 A1* | 2/2005 | Nishiyama et al. | 370/347 |
| 2005/0237965 A1* | 10/2005 | Kuperschmidt et al. | 370/321 |
| 2006/0040701 A1* | 2/2006 | Long et al. | 455/525 |
| 2006/0087984 A1* | 4/2006 | Kim et al. | 370/252 |

OTHER PUBLICATIONS 802.15.3 IEEE Standard for Information technolopgy; Part 15.3: Wireless Medium Access Control (MAC) and Physical layer (PHY) Specifications of High Rate Wireless Personal Area Networks, Sep. 29, 2003.

A Decentralized Reservation Scheme for IEEE 802.11 ad hoc networks, Sep. 7, 2003, G.R. Hiertz et al.

G.R. Hiertz et al., "Mulitband OFDM Alliance—The Next Generation of Wireless Personal Area Networks", Apr. 2005, Proceedings of the 2005 IEEE Sarnoff Symposium, XP002329982.

G.R. Hertz et al., "IEEE 802.15.3a Wireless Personal Area Networks—the MBOA Approach", Apr. 2005, Proceedings of the 11th European Wireless Conference 2005, vol. 1, pp. 204-210, XP002329983.

Zang Yunpeng et al., "Towards High Speed Wireless Personal Area Networks—Efficiency Analysis of MBOA MAC", May 25, 2005, Proceedings of the International Workshop on Wireless Ad-Hoc Networks IWWAN 2005, XP002329984.

* cited by examiner

| OCTETS: 9 | ... | 9 | 9 | 1 | 2 |
|---|---|---|---|---|---|
| DRP IE-N 700.n | ... | DRP IE-2 700.2 | DRP IE-1 700.1 | 1002 | 1001 |

FIG. 10

| OCTETS: 32 | 1 | 1 | 1 | 2 |
|---|---|---|---|---|
| 1105 | 1104 | 1103 | 1102 | 1101 |

FIG. 11

| OCTETS: 1 | 1 | 2 |
|---|---|---|
| 1203 | 1202 | 1201 |

FIG. 12

SYSTEM AND METHOD FOR AN ULTRA WIDE-BAND MEDIUM ACCESS CONTROL DISTRIBUTED RESERVATION PROTOCOL

The present invention relates to a protocol for ultra wide-band (UWB) medium access control (MAC). More particularly, the present invention relates to an enhanced protocol for UWB MAC. Most particularly the present invention relates to an enhanced protocol for UWB MAC comprising a distributed reservation protocol (DRP). The invention also relates to any wireless system that uses a MAC protocol comprising a distributed reservation protocol.

Wireless personal area networks (WPANs) cannot provide the network infrastructure of a typical wireless local area network (WLAN). Nevertheless some existing WPANs like Bluetooth or IEEE 802.15.3 rely on a central unit like the "Piconet Coordinator." This makes topology management more complex and eventually leads to different types of devices. A distributed MAC protocol eliminates the need for a network infrastructure by distributing functions across all devices, i.e., nodes. There is no access point or central coordinator for a decentralized wireless personal area network (WPAN). That is, all devices in a decentralized WPAN exhibit the same protocol behavior and have the same hardware/software capabilities. Asynchronous and isochronous data transfers are supported in most WPANs. Whereas in Bluetooth and IEEE 802.15.3 isochronous transfer is organized by the piconet coordinator, it is handled in a fully distributed manner in the present invention.

In the present invention all devices announce their airtime utilization via beacon transmission, recognize neighboring devices' airtime utilization by receiving beacons from them, and respect other devices' airtime utilization prior to transmitting/receiving data.

This makes the distributed MAC protocol very well suited for ad hoc applications and peer-to-peer networking. Furthermore, the reservation of the medium by the devices on which the distributed MAC is based eliminates sensing and collision times on the medium.

Owing to the distribution of medium reservations, real-time streaming support can be guaranteed. A very efficient real-time streaming protocol enables the controlled delivery of real-time data, such as audio and video. Sources of data can include both live data feeds, such as live audio and video, and stored content, such as pre-recorded events. A real-time streaming protocol (RTSP) for the distributed MAC can be designed to work with established protocols, such as RTP and HTTP.

Data throughput is increased and mesh networking support is significantly improved.

The Multi-Band OFDM Alliance (MBOA) is currently standardizing a new MAC protocol for UWB. The authors of the present invention have created the baseline for this new standard and contributed most of the text of the present invention to the MBOA specification. According to this invention and to the associated MBOA standard, all devices are required to regularly transmit a beacon 105, in order to maintain coordination between communicating devices. Beacon 105 provides the basic timing for the network and transmits information regarding the isochronous reservations. The specific parameters of the protocol that have been chosen by MBOA are a superframe 100 length of 65,536 [usec], which is composed of 256 Media Access Slots (MAS) where each MAS length is 256[usec]. MAS slots are numbered from 0 to 255 and MAS slot 9 is the first slot. Several slot types are defined depending on how the MAS are utilized by the device or devices near by.

Before communication can be established, a device must create its own beacon group or join an existing beacon group. For each beacon phase 102 (also known as a beacon period or BP), 8 consecutive MAS slots are utilized as beacon slots, where all the devices transmit their beacons 105. The start time of a superframe 100 is determined by the beginning of a beacon period 101 and is defined as a beacon period start time (BPST) and MAS slots are numbered relative to this starting time. When a device initiates a new beaconing group, it defines the superframe boundary at any timeslot that does not collide with other beaconing groups' timeslot reservations.

A sophisticated distributed reservation protocol or DRP is needed to better support delay-sensitive applications and to provide an efficient medium access in the distributed MAC. The system and method of the present invention provide a DRP that is compatible with the goals of the distributed MAC.

An important characteristic of the distributed MAC protocol and of the present invention is that reservations are broadcast by the receiver of a packet or a burst of packets. This avoids the hidden-terminal problem, which otherwise hampers efficient operation in mesh networking scenarios. The sender and eventually the neighbours of the receiver and sender also broadcast the reservation.

In the distributed MAC protocol, time is divided into superframes 100, as illustrated in FIG. 1. At the beginning of each superframe 100 there is a beacon interval/phase also known as a beacon period (BP) 101 that is followed by a data transmission interval/phase 102.

A plurality of the beacons 105 within the BP 101 is separated by a short inter-frame space (SIFS) plus mBeaconGuardTime 104.

Devices that are planning data transmission, propose a future starting point in time for the transmission, a transmission duration, a transmission priority, etc. to the intended receiver(s) of the planned transmission. The starting time and duration can be either signalled in the form of a starting time slot and number of time slots or in the form of a bitmap, in which, e.g. a "1" signals the slots that are proposed for the reservation. Two variants of the channel time negotiation are foreseen: explicit DRP negotiation and implicit DRP negotiation.

In the explicit variant, a dedicated "Reservation-Request" management frame is used by the sender to start the negotiation. The receiver evaluates whether the medium is free on the receiver's side during the planned transmission time in the future. In order to be able to carry out this evaluation, every device/node locally stores the reservations of all other devices, e.g., in a bitmap. If the receiver has no other reservation stored for the intended period, the receiver transmits a positive response to the sender of the Reservation-Request. A dedicated "Reservation-Response" management frame is used for this purpose. In the case that the receiver is not willing to accept the transmission or in the case that the receiver has stored another reservation during the planned time, the receiver transmits a negative Reservation-Response to the sender. In this negative Reservation-Response the receiver can optionally propose alternative times for the planned transmission. These alternative times can also be signalled in form of starting time slot and number of time slots or in the form of a bitmap, in which e.g. a "1" signal possible time slots on the receiver side.

If the sender and receiver have successfully negotiated a reservation, both devices include the reservation information in their respective beacon frames in the subsequent MAC-superframe 100. The beacons 105 are transmitted in the BP 101 at the beginning of a superframe 100, see FIG. 1. The sender and receiver(s) include reservation information in their beacons 105 to inform all devices surrounding the sender and the receiver(s) about the forthcoming transmission. Devices, that receive such reservation information in the beacon 105 of another device, register, i.e., store, this reservation information locally, e.g., in a bitmap, and demur from any medium access at the announced point in time on the respective channel (e.g. hopping sequence) and for the duration of the planned transmission. In other words, the locally stored reservation information is used by a device to determine free time on the wireless medium for its own transmissions in which the device is either a sender or a receiver of a transmission. For their own transmissions, the devices select periods in which no reservations of other devices are registered, i.e., stored locally.

In a preferred embodiment, the process of Reservation-Request, Reservation-Response, announcement in the beacon frames of the involved devices and subsequent data transmission is illustrated in FIG. 2. MAC superframes 100 start at regular intervals, known as "beacon period start times" (BPST) or alternatively "target beacon transmission times" (TBTT) 201. In a given superframe 100, a sender transmits a Reservation-Request 202 during the data transmission phase 102 of the superframe 205 and a single receiver (in case of a unicast connection) or multiple receivers (in case of a multicast connection) respond in the same superframe 205 with a Reservation-Response 203. If a reservation is successfully negotiated, both the sender and the receiver(s) include reservation information in their beacons 204 in the BP 101 of the subsequent superframe 206.

In the case of the implicit negotiation, the Reservation-Request and Reservation-Response frames are skipped and the reservation information is directly included in the beacon of the sender. If the receiver detects that its device identifier (ID) or the ID of a multicast group, in which it is participating, is included in a beacon for a stream that did not exist before, it responds implicitly by also including reservation information for this stream in its beacon. It can either include the same reservation information and thereby accept the proposal or include information on alternative times/slots or deny the request. In case that a receiver has proposed alternative times, the sender can either accept the alternative and include the respective reservation information in its beacon or start a new proposal that reflects the availability of the receiver (eventually in the subsequent superframe).

The protocol of the present invention allows for dynamic reservation of transmissions in every superframe 100. However, in order to save the overhead of the Reservation-Request and Reservation-Response message exchange, in the preferred embodiment of this invention, a reservation is automatically interpreted as a reservation not only for the subsequent superframe 206 but also for all following superframes. In the case in which a sender wants to change a reservation, the sender distributes new reservation information in its beacon 105.

In the explicit DRP case the sender or receiver can end a reservation by sending a Reservation Termination frame. In the implicit case the reservation can be ended either by removing the DRP information from the beacon or by transmitting a reservation for the same stream with zero duration. Upon receipt of a Reservation Termination frame or a missing reservation information element in a beacon (or a reservation with zero duration), the devices delete their locally stored corresponding reservation information.

In case that a device receives reservation information for a time in the future for which the device is currently trying to reserve the medium itself, the device is only allowed to distribute its own reservation if the priority of its planned transmission is higher than the priority of the received reservation. In case of equal priorities, the medium is reserved based on a random number (like e.g. the identifier of the stream) or on a first come, first served basis. If a device detects that its own reservation is overruled by another device, it cancels its planned transmission and tries to make a new reservation in a subsequent superframe. All other devices enter the reservation with the higher priority (or e.g. lower random number) in their reservation table stored in a local memory 308.

In summary, the following rules are applied whenever a device attempts to reserve the medium:
(1) if the medium is already reserved by a device, another device may never override this reservation; and
(2) if two devices attempt to make a reservation in the same superframe, the reservation with the higher priority (or lower random stream ID in case of equal priorities) prevails.

These and other features of the system and method of the present invention will become apparent from the following drawings and detailed description of the present invention.

FIG. 10 illustrates a structure of a DRP Request Command and an Optional DRP Complete Command;

FIG. 11 illustrates a structure of a DRP Response Command;

FIG. 12 illustrates a structure of a DRP Termination Command;

It is to be understood by persons of ordinary skill in the art that the following descriptions are provided for purposes of illustration, not for limitation. An artisan understands that there are many variations that lie within the spirit of the invention and the scope of the appended claims. Unnecessary detail of known functions and operations may be omitted from the current description so as not to obscure the present invention.

Figure 1:
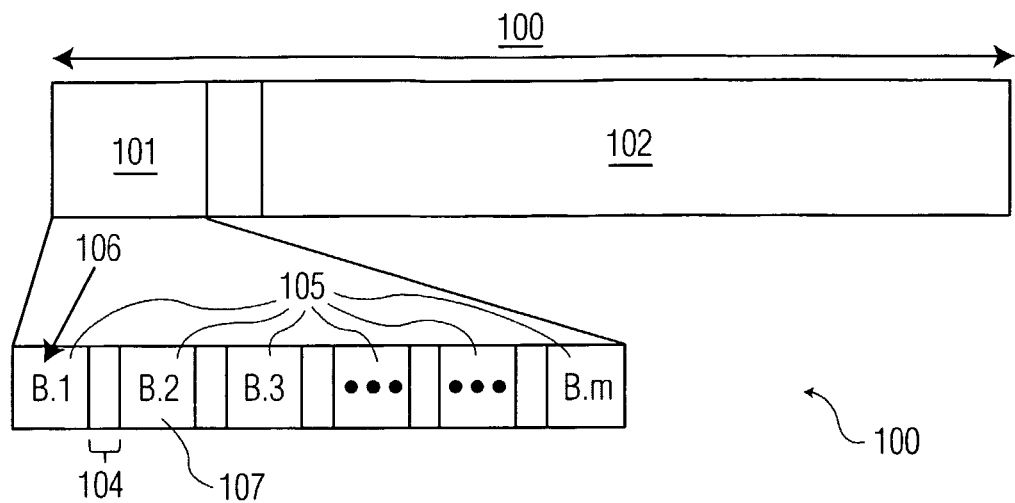
FIG. 1 illustrates an overall superframe layout.
Figure 2:
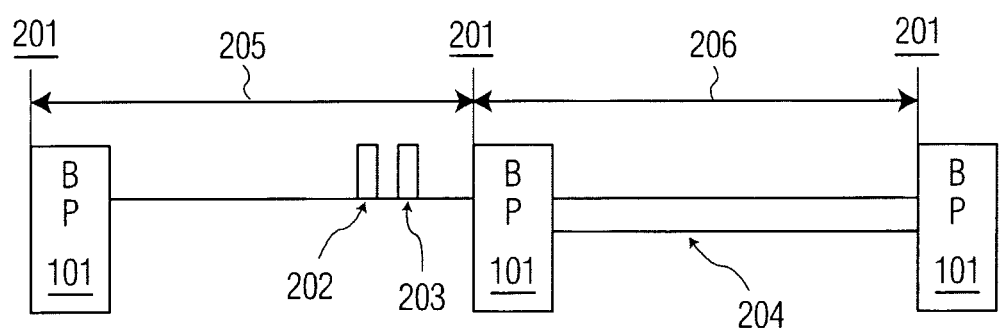
FIG. 2 illustrates an overview of a MAC protocol operation.
Figure 3A:
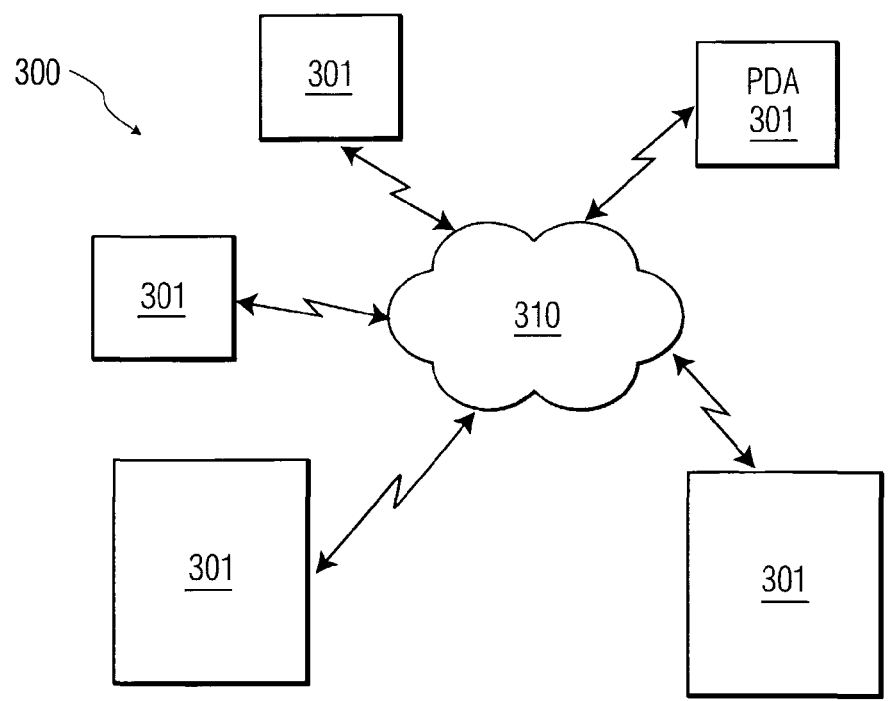
FIG. 3A illustrates a wireless network of devices configured according to the present invention.

FIG. 3A illustrates a representative wireless personal area network 300 whereto embodiments of the present invention are to be applied. The networks include a plurality of wireless personal communication devices 301. In the traditional approach, each device 301 can join any ad hoc network within its radio range 302 and therefore can participate in more than one BP.

Figure 3B:
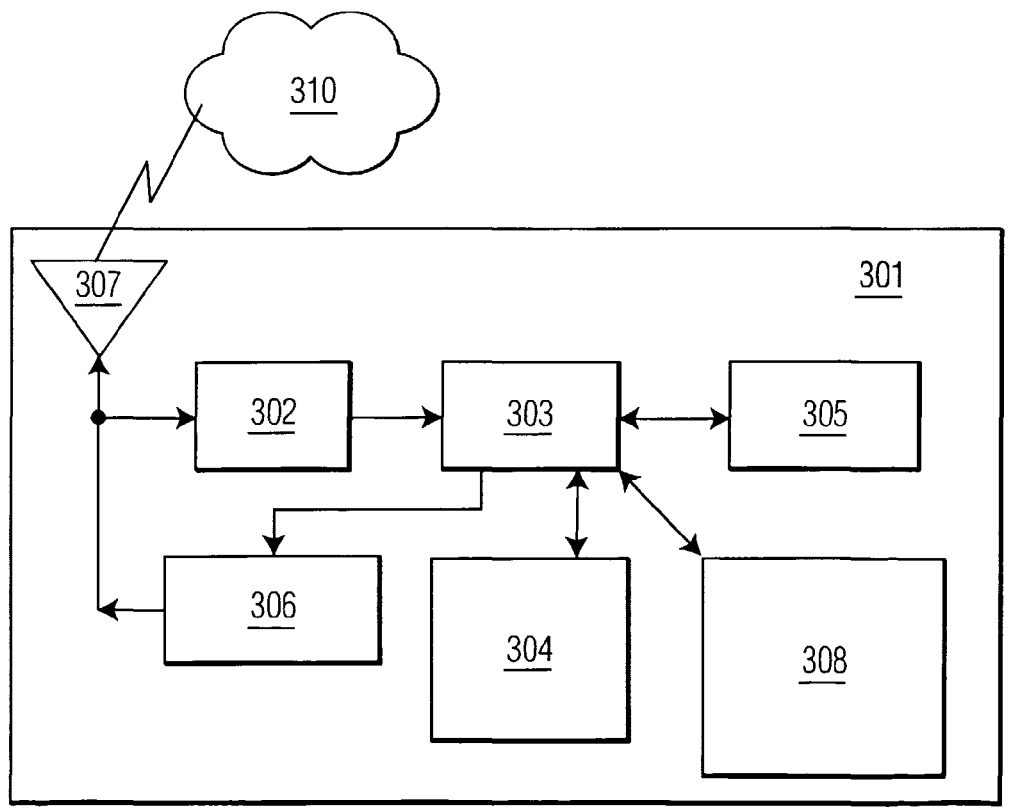
FIG. 3B illustrates a devices configured to perform decentralized access control of the medium according to the present invention.

Each wireless device 101 within the WPAN 300 shown in FIG. 3A may include a system including an architecture that is illustrated in FIG. 3B. Each wireless device 301 may include an antenna 306 coupled to a receiver 302 that communicates over the wireless medium 310. The devices 301 each further comprise a processor 303 and a distributed reservation protocol (DRP) Processing Module 304. For example, in a device the processor 303 is configured to receive from the receiver 302 a DRP Request Command 1000 of one or more DRP Information Elements 700; having corresponding beacon positions and to process the DRP Request Command 1000 using the DRP Processing Module 304 to negotiate a reservation and transmit data according to the result of the negotiation. In a device, the processor 303 is further configured to use the DRP Processing Module 304 to format a DRP Response Command 1100 which the processor then sends via transmitter 306 to a receiver device to respond to a reservation request by specifying parameters shown in FIG. 11. Further, reservations successfully negotiated as well as received in beacons by the wireless device 301 are stored in a persistent store or DRP bitmap 305 to be used by the processor 303 and the DRP Processing Module 304 in responding to future reservation requests and in planning own future reservations. Similarly, a Reservation table 308 stored in a local memory is used to store reservations received and made by the device 101.

Figures 4, 5:
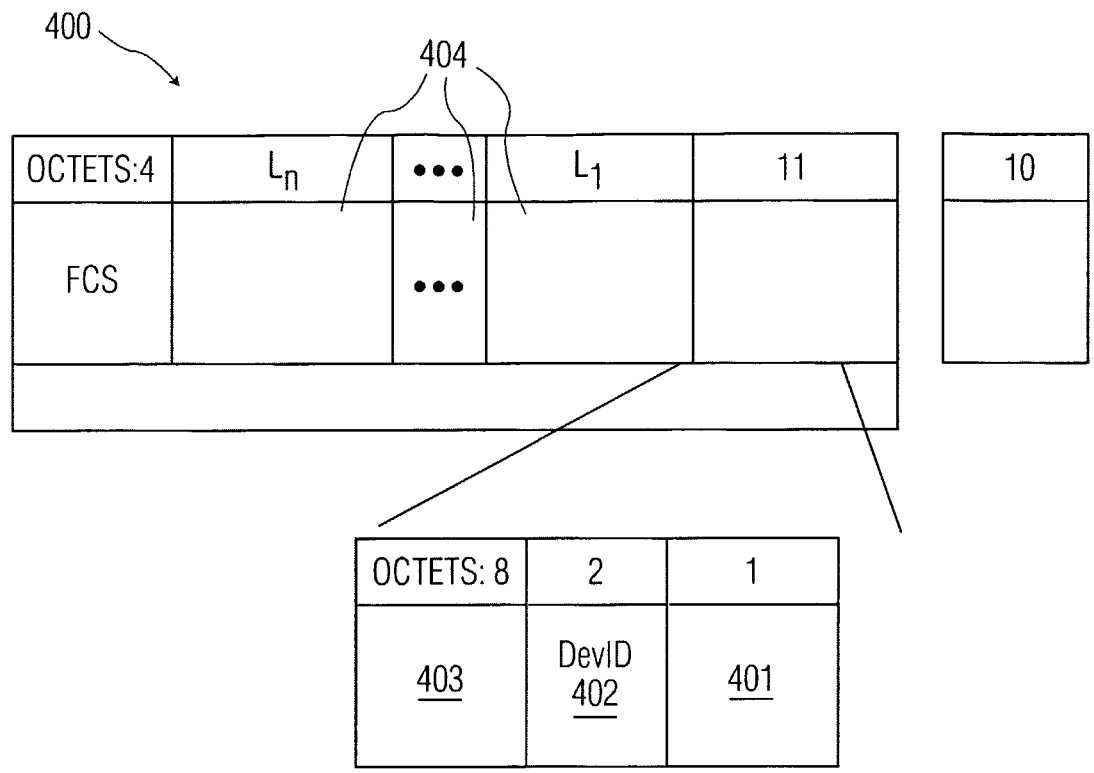
FIG. 4 illustrates a structure of a Beacon Frame of a device.
FIG. 5 illustrates a structure of a Capability Information Element.

In a preferred embodiment, during a BP 101 all devices that are either in an active state or in a standard power-save mode transmit their own beacon 105. The frame body of a beacon 105 comprises the following fields and information elements (IE), as illustrated in FIG. 4:

Slot Number 401;
Device Identifier 402;
MAC address 403; and
a certain number of Information Elements (IEs) 404.

The Slot Number 401 represents the slot, in which the beacon is transmitted. The invention also applies to a system, in which multiple beacon periods are possible within the same superframe in order to support more devices. However, for the sake of simplicity one beacon period is assumed in the following.

The Device ID 402 is a relatively short ID (of e.g. 16 bit) that is derived e.g. from the 48-bit (or 64-bit) MAC address of the device (or randomly chosen) and has the purpose to save overhead when addressing the device.

The MAC address 403 is the 48-bit (or 64-bit) full MAC address of the device.

The Information Elements (IEs) 404 can be of different types. The type of information element can be identified by and Information Element Identifier (ID). Examples of IEs that are described in more detail in this invention are the following:

Device capability (DEV-cap) information element;
Beacon position occupancy information element (BPOIE); and
Distributed Reservation Protocol (DRP) Information Element (IE).

The DEV-cap information element contains information regarding the capabilities of the device and is illustrated in FIG. 5. The Element ID 501 identifies the IE, the Length 502 gives the length of the IE and the Capability Code 503 identifies e.g. in form of a bitmap which capabilities the device supports. Note that FIGS. 4, 5, 6, 7, 8, 10, 11 and 12 have to be read from right to left.

Figure 6:
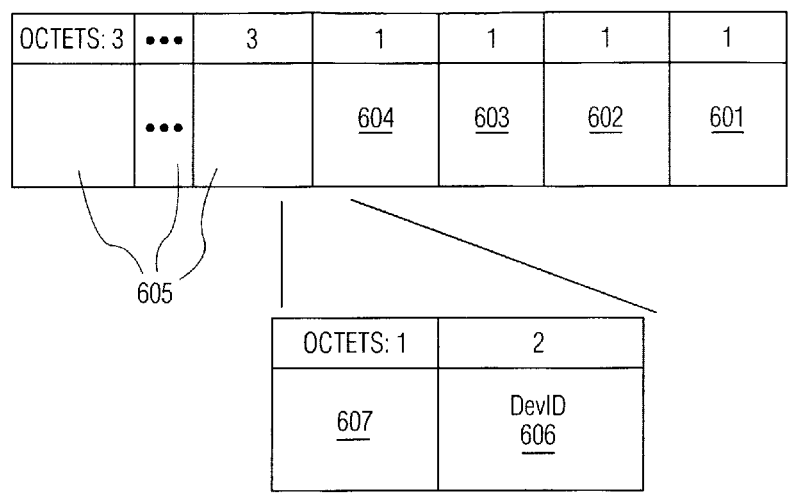
FIG. 6 illustrates a structure of a Beacon Period Occupancy Information Element.

The Beacon Position Occupancy Information Element (BPOIE), illustrated in FIG. 6, contains the Element ID 601, information on the length of the IE 602, information on the length of the whole Beacon Period (in case that the Beacon Period is of dynamic length) 603, further fields 604 that are not specified here (and just mentioned to illustrate that further fields are in-line with the present invention) and finally a list of beacon slot information fields 605. A beacon slot information field 605 indicates a received beacon 105 of another device in the respective slot. Each beacon slot information field therefore includes the number of the beacon slot (position) 607 and a short device ID 606 of the device that sent the beacon 105. The beacon position occupancy information element is required in each beacon 105 because other devices have to be informed whether their own beacon has been successfully received or whether a beacon collision has occurred. The latter can be due to the fact that two devices have randomly chosen the same beacon position in a BP or due to a hidden terminal problem in mesh network scenarios. In the latter scenario, a device might receive two beacons 105 from different devices at the same position in a BP 101 if these two other devices could not hear each other and are not aware of the other device's beacon position.

The distributed reservation protocol information element (DRP IE) is included in the beacon if the device is either a sender or a receiver of a future transmission in the data transmission phase 102 of this superframe 100. In an alternative embodiment the DRP IE is also included in the beacons of direct neighbours of sender and receiver(s).

In a preferred embodiment, a DRP IE is formatted as illustrated in FIG.

The Element ID 701 identifies the information element as a DRP IE.

The Length 702 field gives the length of the DRP information element in number of octets. This is used in order to indicate the beginning of the next IE.

Figures 8, 9:
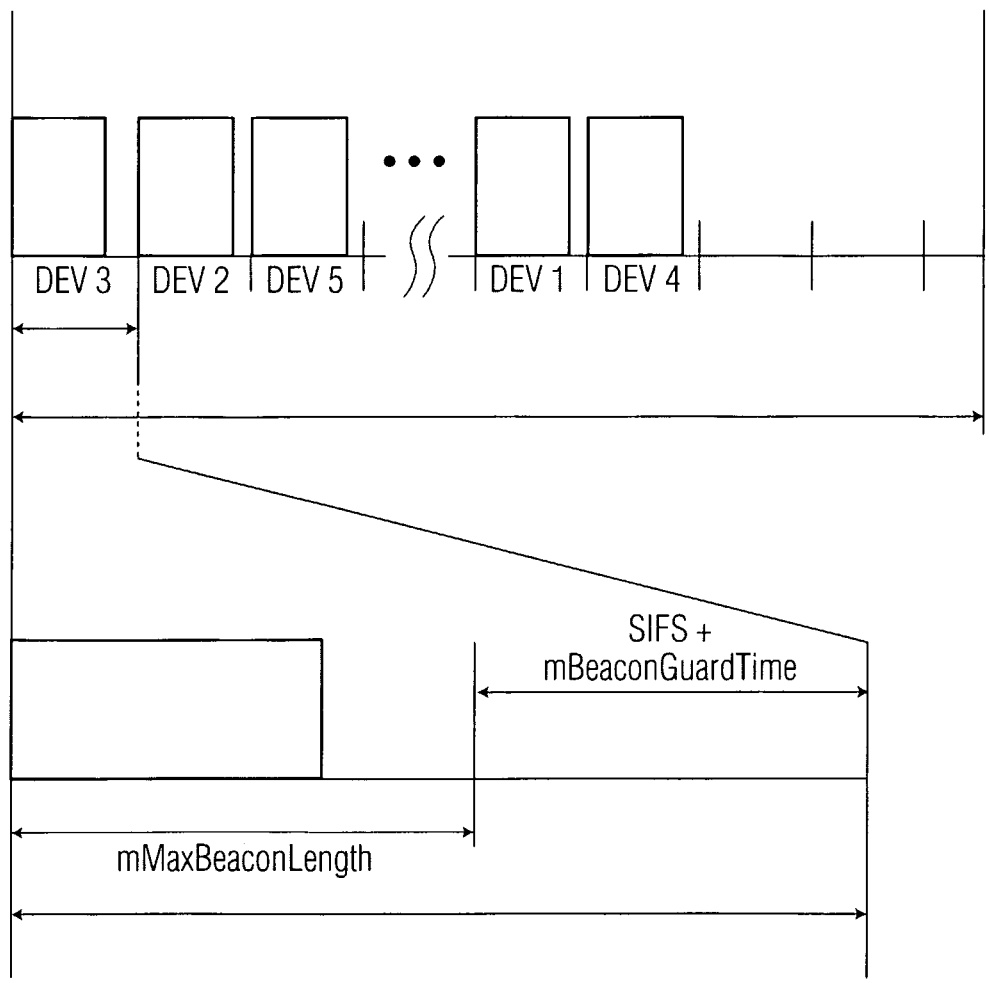
FIG. 8 illustrates a structure of a DRP Control Field.
FIG. 9 illustrates a Structure of Beacon Period.

The DRP Details 703 are illustrated separately in FIG. 8 and include the following fields:

The Tx/Rx bit 801 is set to 0, if the device is the sender of the planned transmission and set to 1 if the device is a receiver. The Tx/Rx bit is only decoded if the reservation is of type Hard or type Soft. In an alternative embodiment of this invention the Tx/Rx bit is used to indicate whether the stream is unidirectional (e.g. unacknowledged) or bi-directional. If the stream is unidirectional the sender may not necessarily have to include the reservation information in its beacon. In a further embodiment the Tx/Rx bit is not present in the DRP IE, because it may not be strictly required.

The ACK Policy Bit 802 is set to 0 for unicast reservations with No-ACK policy and for multicast or broadcast reservations, and it is set to 1 for unicast reservations with Imm-ACK or B-ACK policies.

The Type field 803 indicates the type of the reservation and is encoded as shown in Table 1.

TABLE 1

Types of Reservations

| | |
|---|---|
| 0000 | Beacon Period |
| 0001 | Hard Reservation |
| 0010 | Soft Reservation |
| 0011-1111 | Reserved |

The Priority 804 of the transmission can have a value between 0 and 7, where the priority is chosen according to IEEE 802.1d Annex H.2.

The StreamID 805 is a randomly chosen value, which identifies the data stream and is used to distinguish multiple streams between the same set of sender and receiver(s).

The Channel Number 806 is set to the channel number used for data transmission. In case that data transmission and beacon transmissions are always carried out on the same channel, this field is obsolete. It is shown here for completeness.

The Destination/Source DEVID 704 is set to the DEVID of the receiver, multicast-group or broadcast ID, in case that the device is the sender of the transmission, and is the DEVID of the sender in case that the device is a receiver of the planned transmission.

Figure 7:
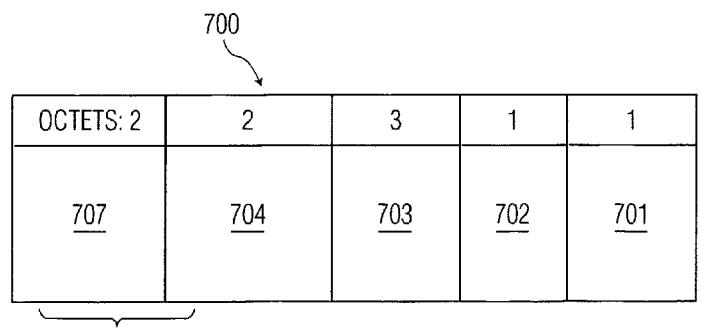
FIG. 7 illustrates a structure of a Distributed Reservation Protocol Information Element with alternative structures of the reservation information in sub-FIGS. 7A, 7B and 7C.
Figure 7A:
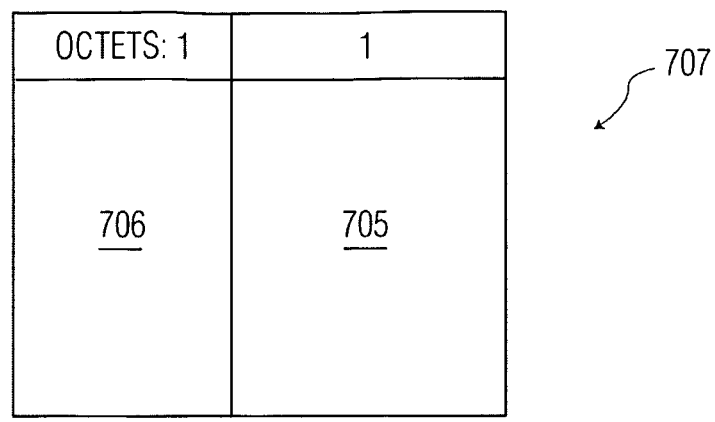
Figure 7B:
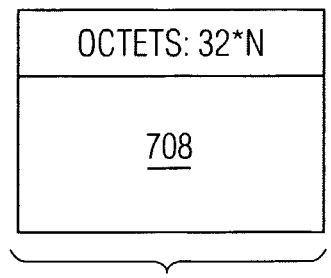
Figure 7C:
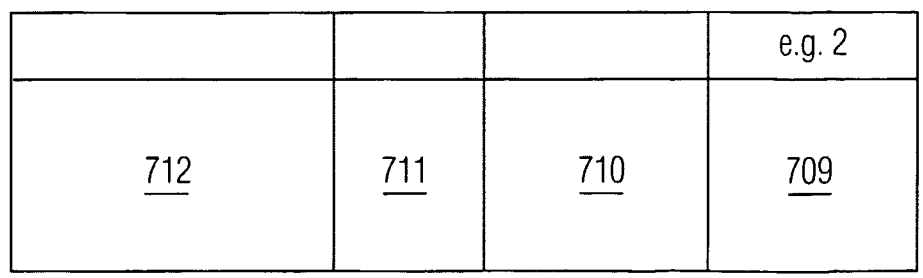

A Reservation Block 707 contains the information on the reserved times, rsp. time slots inside the superframe. Various ways to signal the reserved times are possible. Three exemplary encodings of a Reservation Block are illustrated in FIGS. 7A, 7B and 7C. Other ways can be thought of, which do not change the essence of the present invention. Several Reservation Blocks can be included in one DRP IE. This is useful to signal more than one reservation in a single DRP IE.

In a first embodiment, shown in FIG. 7A, the reservation is given by BPST Offset (or alternatively TBTT Offset or period of reservation) 705 and Duration 706. The BPST Offset (or TBTT Offset or period) defines the starting time of the planned transmission. It is set to the slot number of the first reservation slot, which is defined relative to the BPST. In an alternative embodiment (e.g. for non-slotted systems) the BPST Offset is given in multiples of symbols (312.5 ns). In yet another embodiment the Offset is not defined relative to the Beacon Period Starting Time but relative to the Target Beacon Transmission Time (TBTT) of the beacon of the device. In a further embodiment the Offset field gives the Offset between two consecutive reservations, i.e. the period of the reservation.

The Duration 706 contains, in multiples of data slots, the duration of the reservation. In the alternative embodiment the duration is given in multiples of symbols (312.5 ns).

In a further embodiment of the invention, the starting point and duration of the reservation are signalled by means of a Bitmap 708, in which one or several bits are describing the state of each MAS, as shown in FIG. 7B. In case of a single bit per MAS, the starting point of the reservation is e.g. given by the first MAS with a "1" in the bitmap and the length is given by the number of consecutive "1s" in the bitmap.

As an example only, both previous embodiments can also be combined into a generalized Reservation Block, as illustrated in FIG. 7C, where the period of the reservation as well as the bitmap are combined. In a reservation field of the most general form a Type of Reservation field 708 could indicate whether the reservation is periodic with multiple reserved times per superframe or whether the reservation reserves a single time period in the superframe. Especially in the case of a single reserved period per superframe, the Type of Reservation field could also indicate whether the reservation is only valid inside the respective superframe or whether it is also valid for all following superframes until the reservation is terminated. In order to combine period of reservation and bitmap, the e.g. 256 slots of the superframe could be divided into M blocks, where M is the minimum possible period of the reservation. The Period field 710 then gives the period of the reservation as a multiple of the minimum reservation period. The Offset field 711 gives the offset of the block that includes the first reservation (for periodic reservations), rsp. a single reservation, in number of blocks. The bitmap field 712 indicates in form of a bitmap the reserved slots inside a reservation block. Thus, the generalized structure of the reservation field is a combination of offset and bitmap concepts.

Note that the DRP IE can contain further elements or have a different structure without changing the essence of the present invention. An example of a potential additional field may e.g. be a field that indicates whether the DRP negotiation was successfully completed.

Devices that intend to participate in communication with other devices employ a BP access method to send a beacon during a BP 101. A device does not transmit frames other than beacons 105 during a beacon period. A device scans for other devices' beacons 105 during its BP 101.

A BP can be of dynamic length (with a given maximum length) and consists of a certain number of MAS slots. Each MAS slot contains 3 beacon slots of duration mBeaconSlotLength. The beacon frame length cannot exceed mMaxBeaconLength $$m\text{BeaconSlotLength}=m\text{MaxBeaconLength}+\mathit{SIFS}+m\text{BeaconGuardTime}$$

This means the beacons 105 within a BP 101 are separated by a "short inter-frame space" (SWFS) 104 plus mBeaconGuardTime. A variable BP 101 has the considerable advantage that the overhead of beaconing is minimal in typical cases of one sending and one or more receiving devices.

If a new device joins the network it listens to at least one full first beacon interval and evaluates the information contained in the beacons 105. From the received beacons 105 as well as the BPOIEs contained therein, the new device deduces occupied beacon positions. In the same or the following superframe 100 (depending on the processing speed of the device), the device transmits its beacon in one of the free beacon slots or appends it at the end of the BP thereby increasing the size of the BP. If two devices have chosen the same additional beacon position/number, e.g. they have joined the network in the same superframe 100, the devices detect the collision in the following superframe 100 by the missing BPOIE. In such a case a device re-transmits its beacon 105 in the superframe 100, which follows its last try, in a different free beacon slot In a similar way the BP can also be reduced in size if a device has left the network and its beacon slot has become free.

For each beacon period, a device maintains a bitmap to store the occupancy of beacon slots and the associated DEVID. A beacon slot is marked as busy in the bitmap whenever:
  a) a beacon is received during that slot; or
  b) the beacon slot is included in the BPOIE received from a device in the same beaconing group.

A beacon slot is changed from busy to idle whenever:
  a) a beacon has not been received in the slot during mMaxLostBeacons consecutive superframes, and
  b) the slot information has not been included in BPOIEs received from any device in the same beaconing group during mMaxLostBeacons consecutive superframes.

Devices send their beacon 105 in the same beacon slot in subsequent superframes unless a collision occurs.

Devices employ a beacon collision resolution protocol (BCRP) to resolve beacon slot selection collisions. Devices include the BPOIE in all beacons 105.

Upon reception of a beacon frame, a device saves the DEVID of the sender and the slot number where the beacon is received. This information is included in the BPOIE sent by the beaconing device in the following superframe. Only the information of beacons received during a superframe 101 is included in the BPOIE sent in the following superframe.

If the DEVID of the device is missing in the BPOIE from a neighboring beacon during mMaxLostBeacons consecutive superframes, the device changes the beacon slot to an idle slot in the following superframe. DRP reservations are maintained, and do not need to be re-negotiated if the beacon slot is changed.

Devices may beacon in multiple beacon periods. Devices maintain a separate bitmap for each beaconing group. A BPOIE is calculated independently for each beacon group, and the device sends the BPOIE for each beaconing group in the corresponding beacon period.

If a neighbor BP 101 is detected, the device includes a DRP IE 700 of type BP reservation in its own beacon. The DRP reservation extends across the MAS slots that the neighbor BP 101 is using.

Devices that receive a beacon that includes a DRP reservation of type BP, scan for neighbor BPs. If, during the scanning process, a neighbor BP is detected, a DRP reservation 700 of type BP is included in its own beacon. The DRP reservation extends across the MAS slots that the neighbor BP is using.

Peer devices that wish to communicate, a beacon in the same BP 101. If a transmitter device communicates with devices that beacon in multiple (different) BPs 101 because they are members of more than one beaconing group, the transmitter device beacons in these multiple BPs 101.

Devices periodically scan for beacons in all existing BPs 101 in order to maintain the state of existing reservations, and potentially resolve collisions. Devices scan all beacon periods to determine existing reservations before making a new reservation or changing a reservation. Devices may optionally send beacons in neighbor BPs 101 to announce changes in the reservations. Reservations received from neighbor BPs 101 are honored following the same rules as for reservations within the Beaconing Group of the devices.

If existing DRP reservations collide with a BP 101, the BP 101 has the highest priority, and therefore existing DRP reservations are renegotiated. If two or more BPs 101 collide, devices with colliding beacons search for empty non-colliding slots. Optionally a device may start a new BP 101 in other idle slots.

A BP 101 terminates, and therefore the BP reservation can be cleared, when no beacon 105 is received during that BP 101 for at least mMaxLostBeacons consecutive superframes 101.

In a preferred embodiment just a single beacon period per superframe is allowed. If two formerly separated groups of devices and their associated beacon periods come into range, they have to merge into a single beacon period. This single beacon period is located at the beginning of the superframe. The rules for scanning other beacon periods and protecting them by BP reservations are not needed for this embodiment but may be applied in the transition phase during the merging of the beacon periods.

As described in the summary of the invention, the DRP protocol of the present invention allows for explicit or implicit negotiation of the reservations. In the explicit case the reservations are established by a DRP Request and DRP Response command or control handshake. In an alternative embodiment a three-way handshake is employed, in which a DRP Request and a DRP Response are followed by a DRP Complete frame, which is sent by the same device that sent the DRP Request frame. In the explicit case a reservation is terminated by a DRP Termination frame. In another aspect of the invention, this DRP Termination frame is repeated by all devices that had previously also announced the reservation. In yet another aspect of the invention, a reservation is terminated by including a DRP IE with zero duration or by removing the corresponding DRP IE.

In the implicit case, the handshake is carried out implicitly by including a DRP IE in the beacons of sender and receiver(s) and no command/control frames are sent beforehand.

The DRP Request Command 1000 may be used to request or modify a DRP reservation. The DRP Request Command 1000 is formatted as illustrated FIG. 10.

Each DRP IE field 700.*n* included in the DRP Request Command 1000 corresponds to a non-contiguous DRP request. Each DRP IE 700.*n* is formatted as defined above for FIG. 7. The StreamID is set to the same value in each DRP IE 700.*n*.

The DRP Response Command 1100 is formatted as illustrated in FIG. 11.

The StreamID 1103 value is copied from the DRP Request DRP IEs 700.*n*.

The Reason Code 1104 indicates whether a DRP Request was successful or unsuccessful. The codes assignable to this field are:
0=Success
1=Channel Time unavailable
2=Requested Super Rate unsupported
3=Request Denied
4-255=Reserved During a unicast DRP negotiation, if the Reason Code is set to 1, the device includes the Availability Bitmap 1105 in the DRP Response Command. The Availability Bitmap 1105 may also be included for all other reason codes, even though this is not necessary.

During a multi cast DRP negotiation, the device includes the Availability Bitmap 1105 in the DRP Response Command for Reason Codes 0, 1 and 2. Again, the Availability Bitmap 1105 may also be included for all other reason codes, even though this is not needed.

The Availability Bitmap field 1105 contains 256 bits. Each bit corresponds to a MAS slot. A value of 1 indicates that the MAS is not available for DRP allocation. A value of 0 indicates that the MAS is available for DRP. The definition of the bits could obviously also be inversed. In an alternative embodiment, the bitmap also includes more than one bit per MAS.

In alternative embodiments, in which the starting point and duration of the reservation in the DRP IE are signaled by means of a bitmap or a combination of offset and bitmap the responder could also include a full or part of an DRP IE in the DRP Response frame instead of the Availability Bitmap.

The optional DRP Complete command, that is sent in an alternative embodiment of the invention by the same device that had initiated the negotiation with the DRP Request frame after the DRP Response has been received, has the same format at the DRP Request command in FIG. 10.

The DRP Termination command is formatted as illustrated in FIG. 12.

The StreamID indicates the delivery identification of the DRP being terminated.

In a preferred embodiment a second medium access mechanism based on contention-based access is defined beside the DRP access. This contention-based access can be used for all MAS slots, which have not been previously reserved by the DRP protocol. The contention based access may also be used as fallback access mechanism for traffic that is using DRP in case that a reserved channel time is unusable, e.g. for interference reasons, and a new reservation needs to be established.

In case of the DRP access method, the negotiation of a reservation is triggered by an application-dependent stream set-up and carried out during or after the higher layer stream set-up. However, the DRP negotiation should not be considered as a connection set-up but only as a channel time negotiation procedure. The negotiation can be repeated, i.e. the allocated channel time changed, at any time during the lifetime of a stream.

The DRP of the present invention enables devices to make a reservation for one or several periods of the data phase 102 of a superframe 100. The reservation guarantees periods of time for transmission, defined by a start MAS slot and a duration of MAS slots, a bitmap or a combination of these formats. The reservation mechanisms may be used, for example, for power saving and/or isochronous QoS. All devices that are senders or receivers of DRP reservations announce their reservations in their beacons 105.

Another type of reservation is a special type of hard reservation for other beacon periods. This is useful for other devices to detect the presence of foreign beacon periods.

In a preferred embodiment, different types of reservations are defined: hard reservations, soft reservations and BP 101 reservations. Hard Reservations are equivalent to a TDMA slot. Soft reservations may be used to allow the reuse of unused reservation time. The reservation type is announced in the DRP Information Element 700 included in a beacon 105, as well as in the DRP Request 1000 Command frame in case of an explicit DRP negotiation. All devices decode beacons 105 and DRP IE 700 and follow the access rules specified for each reservation type.

In a hard reservation only the owner of the reservation can access the medium, even if the medium is idle. Other devices are only allowed to access the medium after the sender and receiver(s) have released the unused reservation During a hard reservation the sender and receiver(s) of the reserved data transfer may not need to exchange RTS-/CTS- frames before the transmission of the data as the medium is already cleared around the sender as well as the receiver by the DRP IEs 700 included in the beacons 105.

In a soft reservation period other devices can access the medium following the contention-based access rules. The owner of the reservation can access the medium with the highest priority and without performing back-off. Even though the reservation mechanism should exclude any collisions, it might still be possible that a device has not received the reservation information, in which case carrier-sensing could eliminate a potential collision. In an alternative embodiment of the invention even the owner of the reservation has to sense the medium for a certain duration. The soft type of reservation is especially useful, if the sender does not use its previously reserved time slots. In this case the slots are still accessible for other devices in contention mode.

Beacon Period reservations can be considered as a special type of hard reservation. They are useful to protect foreign beacon periods (during the transition phase before beacon periods are merged or in the case where multiple beacon periods per superframes are allowed) and to indicate the presence of the foreign beacon period to neighboring devices.

Further types of reservations are possible and are within the scope of the present invention.

Guard times are required to keep transmissions in adjacent reservations from colliding. In addition, a SIFS time is required to ensure sufficient turnaround time between transmissions. A reservation is defined by the starting MAS slot 705 and the duration in MAS slots 706, as specified in the DRP IE 700.

Figure 13:
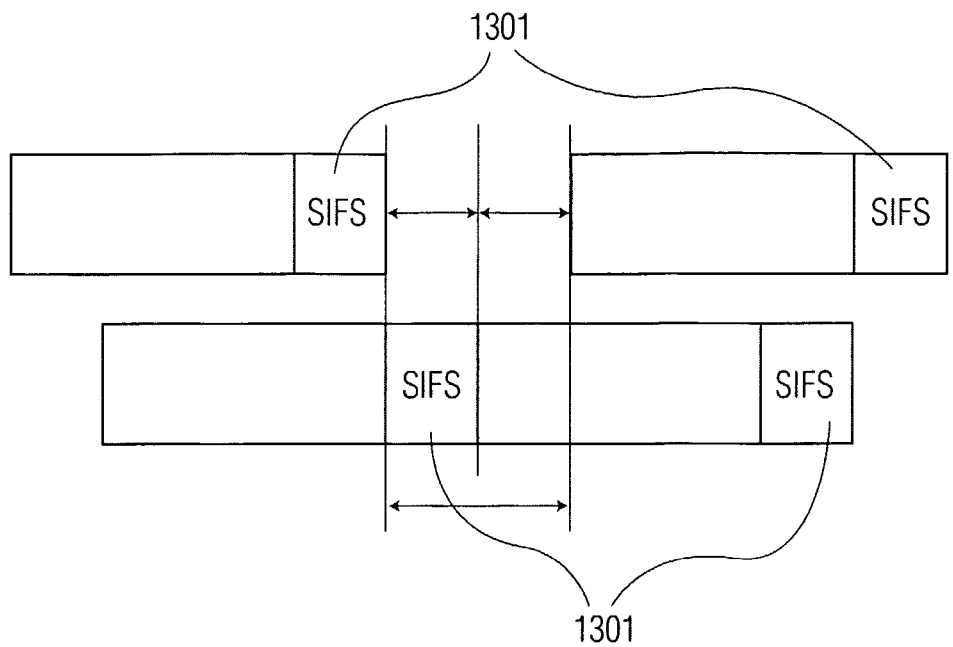
FIG. 13 illustrates a Guard Time.

Guard time is the time between the end of one reserved period and the start of the next reserved period. Including SIFS as part of a reserved period and allocating guard time between reserved periods ensures that transmissions are spaced by at least a SIFS. FIG. 13 is an illustration of how guard time is allocated such that transmissions are separated by at least a SIFS 1301 if the owners of adjacent reserved periods drift towards each other.

The required guard time depends on the maximum drift between DEV's local times. This drift is a function of the time elapsed since a synchronizing reference event. Each device maintains a nominal beacon period start time (BPST), which serves as a time reference. A device adjusts its BPST in order to maintain superframe synchronization with the neighbor with the slowest clock in its beacon group. The device measures the difference between the actual time at which the beacons from each neighbor are received and the expected times. The difference is positive, if the neighbor has a slower clock. Subsequently the device delays its BPST by the maximum difference to all neighbors in the beacon group.

The guard time is the sum of the maximum possible drift (which depends on the minimum clock accuracy) and the SIFS time.

Inside a hard reservation a device starts its transmission at the beginning of the first MAS of the reservation based on its local clock. In a soft reservation or alternative embodiments the transmission may have to be preceded by a scanning time. Inside the reservation, the sender can send as many packets as it wants to, i.e. also a burst of data packets, in which packets are e.g. separated by SIFS pause times.

Figure 14:
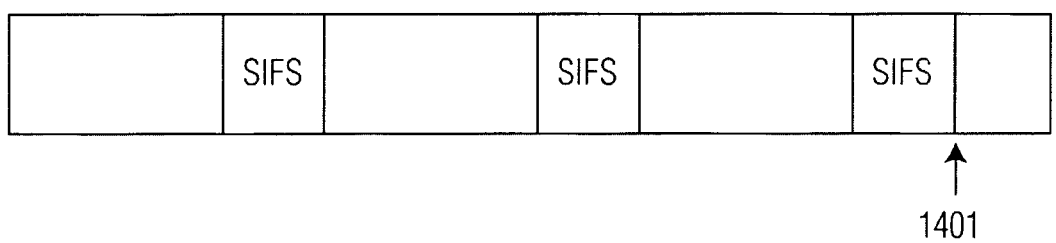
FIG. 14 illustrates SIFS and Guard Time at the end of a DRP reservation with no-ACK.
Figure 15:
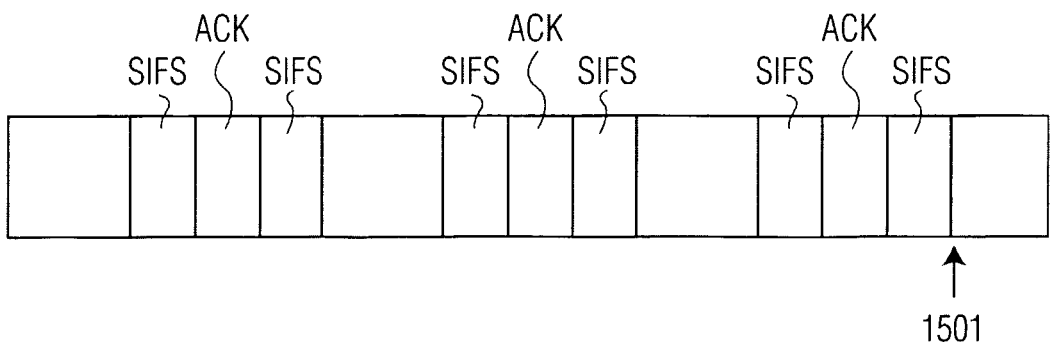
FIG. 15 illustrates SIFS and Guard Time at the end of a DRP reservation with Imm-ACK.

The receiver may not acknowledge the DATA frames (FIG. 14), acknowledge every single DATA frame by an immediate (Imm) ACK frame (FIG. 15) or acknowledge a burst of DATA frames by a burst/delayed ACK frame. The burst/delayed ACK-frame contains information that acknowledges each preceding data packet, thus allowing a selective reject of failed frames.

The sender ensures that the time required for the access time (in case of soft reservations) the burst of packets such that the ACK and the final SIFS time do not exceed the length of the reservation. In case that a transmission of another device had blocked a certain interval during the reserved interval, the sender reduces the amount of data sent accordingly in order to guarantee the ending of the transmissions on schedule.

Because the clock in one DEV may be fast and another may be slow relative to the ideal time, a DEV that is expecting to receive either a beacon 105 during the BP 101 or a frame during a DRP reservation begins receiving before the time that it calculates to be the start of the BP 101 or DRP Reservation and continues receiving after the time that it calculates to be within one SIFS of the end of the BP 101 or DRP reservation. The a mount of time that the DEV listens before the start of the DRP reservation or BP 101 and after the end of the DRP reservation or BP 101 is up to the implementer.

There are two mechanisms of negotiating a reservation of channel time: an explicit negotiation by means of dedicated DRP Request/Response 1000/1100 (and optionally DRP Complete) command/control frames, and an implicit negotiation by inclusion of the DRP IEs 700 in the beacons 105 of sender and receiver(s). The reservation is negotiated between sender and receiver(s) of the planned transmission. Once the reservation is established, the reservation information is included in the beacon 105 of sender as well as receiver(s) in every superframe 100, in which the reservation is still active. This is necessary in order to inform neighboring devices of sender and receiver(s) about the existing reservation. The beacons 105 of sender and receiver(s) of a DRP stream are sent in the same BP 101. However, reservations are defined across BPs 101. Therefore, devices scan all BPs 101, to determine existing reservations, before starting a new DRP negotiation or changing an existing reservation. Furthermore, devices periodically scan for beacons 105 in all existing BPs 101 in order to maintain the state of existing reservations, and potentially resolve collisions. In a preferred embodiment there is only one beacon period, which has to be scanned, rsp. decoded.

Each device announces in its beacon 105 whether it is capable of explicit DRP negotiation using DRP Request/Response 1000/1100 Command/Control frames and whether it is capable of implicit DRP negotiation by inclusion of the DRP IEs 700 in the beacon 105. A device does not start a DRP negotiation with a device that does not support the respective DRP negotiation mechanism. Devices that are capable of neither explicit nor implicit DRP negotiation nevertheless respect reservations that are announced in the DRP IEs 700 of other devices' beacons 105.

Figure 16:
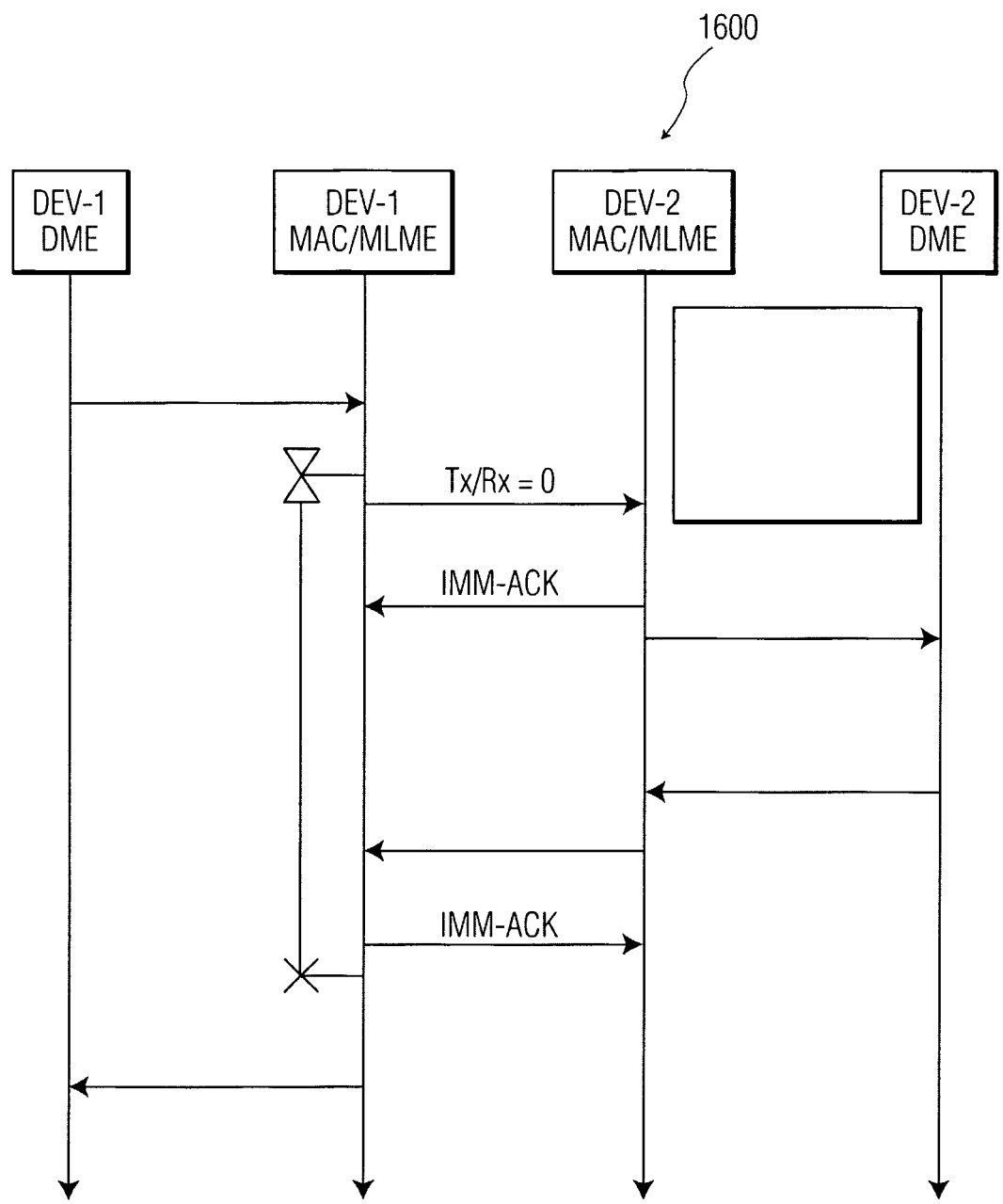
FIG. 16 illustrates a Message Sequence Chart (MSC) for a sender initiated unicast reservation.
Figure 17:
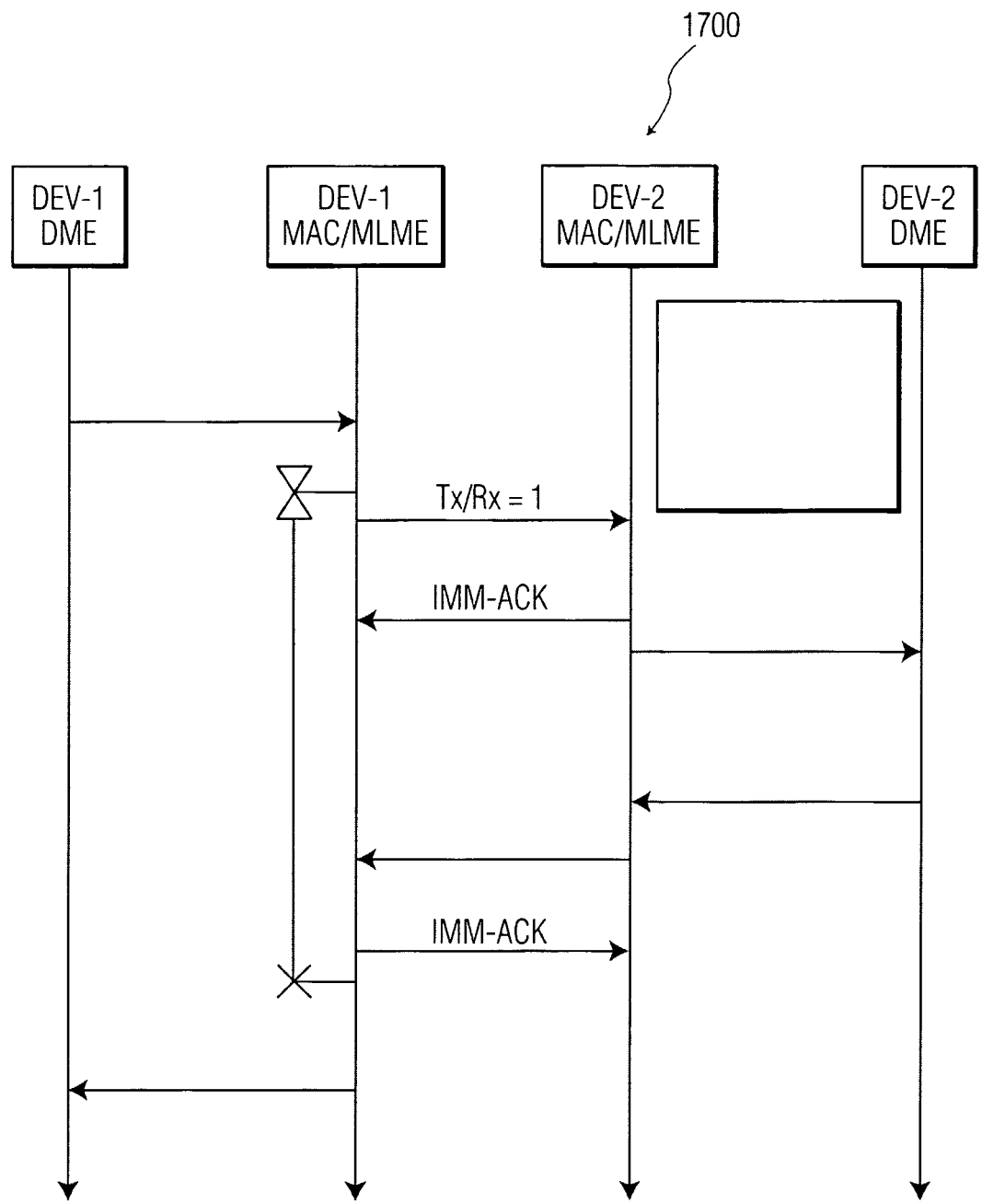
FIG. 17 illustrates an MSC for receiver initiated unicast reservation.
Figure 18:
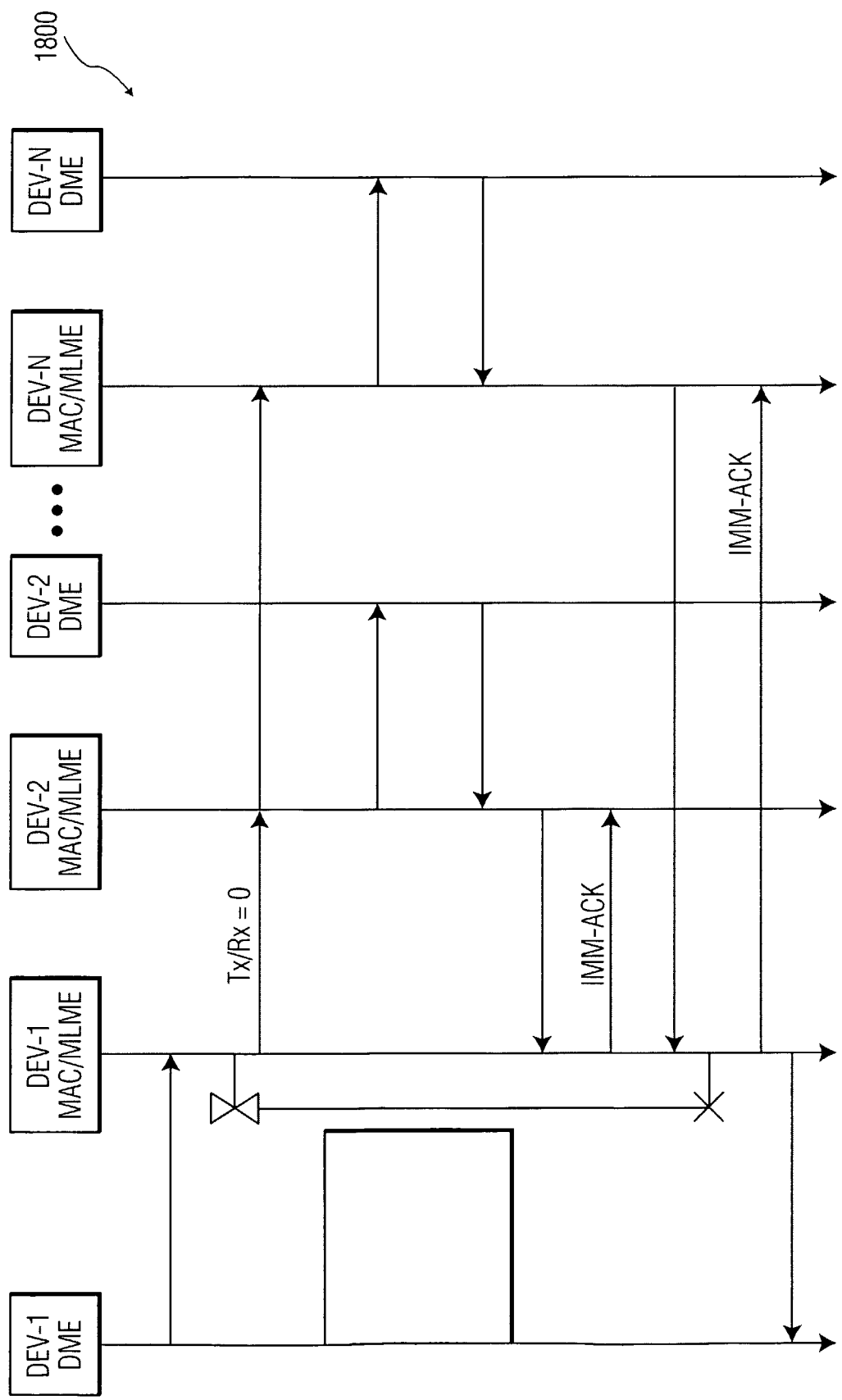
FIG. 18 illustrates an MSC for sender initiated multicast reservation.
Figure 19:
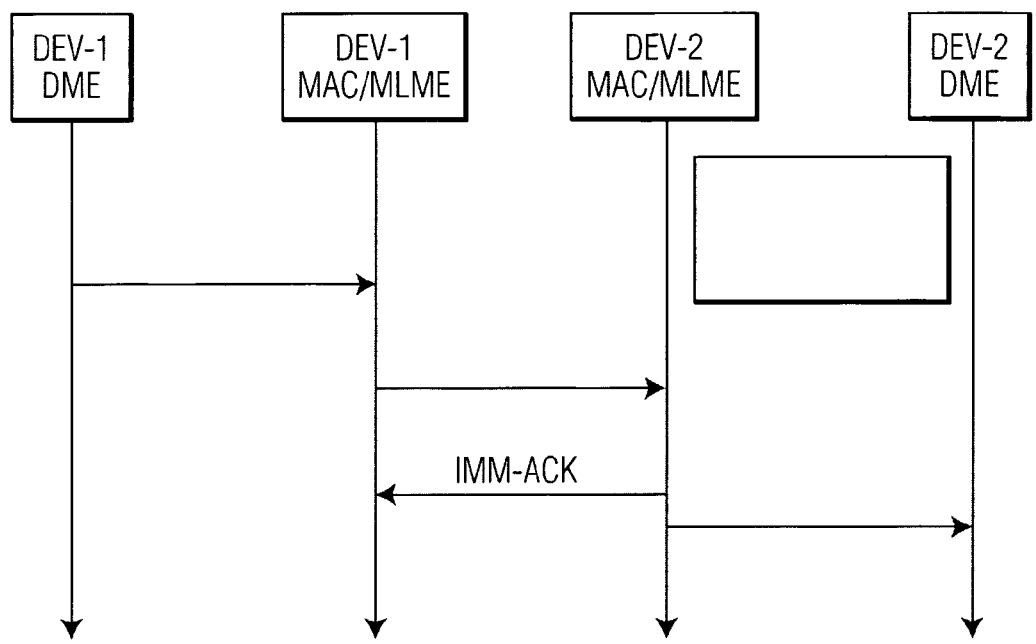
FIG. 19 illustrates an MSC for unicast DRP Termination.

Explicit DRP negotiation makes use of the DRP Commands sent using e.g. a contention-based access mechanism (but could e.g. also be sent inside an already negotiated reservation). An explicit unicast negotiation can be initiated either by the sender or receiver of the planned transmission, even though the sender-initiated negotiation is the preferred embodiment of the invention. An explicit multicast negotiation can be initiated only by the sender of the multicast group. The sequence of messages used during the sender-initiated unicast negotiation is illustrated in FIG. 16, the sequence of messages used during the receiver-initiated unicast negotiation in FIG. 17. The sequence of messages used during the sender-initiated multicast negotiation is shown in FIG. 18. The alternative embodiment with a three-way handshake is not illustrated explicitly as the initiator just sends an additional DRP Complete frame at the end of the sequence to confirm the completion of the negotiation.

The receiver-initiated negotiation is analogous to the sender-initiated negotiation with the only difference being that a single bit in the DRP Request Command/Control frame 1000 is set to "0" instead of "1" to indicate that the device intends to be a receiver instead of the sender of the stream.

The device may request multiple DRP reservations for the same stream simultaneously with a single DRP negotiation. In each DRP IE 700 a starting MAS slot, specified in the BPST Offset field, and a duration, in multiples of MAS slots is proposed. The StreamID in each DRP IE 700 is set to the same value, which is chosen randomly at the first set-up of the stream or given by a higher layer while assuring that the StreamID is unique for the pair of devices (or set of devices in case of a multicast connection). The initiator chooses the MAS slots of the proposed reservation based on its locally stored information, thus respecting existing reservations and considering the availability of the receiver(s).

Upon reception of a DRP Request with a unicast destination DEVID the device responds with an Imm-Ack frame followed by a DRP Response command/control frame. The DRP Response command is sent using the contention-based access after the Imm-Ack has been sent and the request has been processed. If the Imm-Ack is not received, the sender may retransmit the DRP Request frame in the contention-based access mode.

Once the DRP Request Command 1000 is sent, the device waits for mDRPRequestTimeout. If a DRP Response Command 1100 is not received within mDRPRequestTimeout time after the request is sent, the device may retransmit the DRP Request Command 1000.

Upon reception of a DRP Request Command/Control frame 1000, in which the receiver DEVID matches the ID of a multicast group to which the device is subscribed, the device does not respond with an Imm-Ack frame. The device replies to the command with a DRP Response Command 1100 e.g. in the contention-based mode.

The receiver of the DRP Request Command 1000 evaluates whether the medium is free during the requested time according to the locally stored information. If the medium is free and the device has no transmission or reception is scheduled during the requested time, the device may respond with the DRP Response Command 1100 with a status code equal to success and thereby positively acknowledging the DRP Request.

If the receiver of the DRP Request Command 1000 cannot accept the request due to conflict with other reservations, the reason code in the DRP Response Command 1100 is set to "channel time unavailable". The DRP Response Command 1100 includes the Availability Bitmap in this case to announce the available slots for DRP.

Upon receiving the channel time unavailable in DRP Response Command 1100, the sender of the DRP Request Command 1000 may re-initiate the negotiation process with a new DRP Request Command 1000 with a time that matches the Availability of the receiver.

If the receiver of a DRP Request Command 1000 finds out that the medium is occupied during the proposed reservation time and if no alternative period can be identified, the receiver of the DRP Request Command 1000 replies with a DRP Response Command with the reason code set to "request denied". The reason code is also set to "request denied", in case that the receiver is not willing to accept the reservation for any other reason.

In the case that the DRP Request Command 1000 is sent by the sender of a multicast group, this sender might receive multiple DRP Response Commands 1100. Some of the responses may indicate unsuccessful negotiation. The sender may try to choose a reservation period that is possible for a maximum number of receivers based on the Availability Bitmap in the DRP Response frames. Receivers that cannot be served during the best possible reservation period could be served in separate unicast or multicast reservation periods. These reservations need to be set up by separate DRP negotiations.

If sender and receiver(s) have successfully negotiated a reservation, they include the reservation information in their respective beacons 105 in the BP 101 of subsequent superframes 100.

In an alternative embodiment of the invention only the receiver(s) include the reservation information in their beacon. This would e.g. be possible in case of a unidirectional connection.

In a further embodiment the receiver and all its direct (1-hop) neighbor devices include the reservation information in their beacon.

In yet another embodiment the sender, the receiver as well as all direct (1-hop) neighbors of sender and receiver include the reservation information in their beacon.

In case that either sender or receiver of a unicast stream or the sender of a multicast stream want to change the reservation, they can either initiate a new DRP Request Command 1000 and DRP Response Command 1100 message exchange or use the implicit DRP negotiation using DRP IEs 700 in their beacons 105.

A unicast DRP negotiation using DRP IEs 700 in beacons 105 (called implicit negotiation) can be initiated either by the sender or receiver of a planned transmission, even though the sender-initiated negotiation is the preferred embodiment of this invention. An implicit multicast negotiation can only be initiated by the sender of the multicast group.

With the implicit DRP negotiation using DRP IEs 700 in beacons 105, no DRP Request Command 1000 or DRP Response Command 1100 is sent prior to the inclusion of the DRP IEs 700 in the beacons 105 of sender and receiver(s) of the stream. This type of DRP negotiation is therefore suitable for devices, which do not support the contention-based channel access.

A device only initiates an implicit DRP negotiation with devices that support at least the implicit DRP negotiation. Devices that support the explicit DRP negotiation by DRP command/control frames also support the implicit DRP negotiation. There may be devices that do only support the implicit DRP negotiation.

A device can initiate an implicit DRP negotiation by including a corresponding DRP IE 700 in its beacon 105. The "Tx/Rx bit" in the DRP IE is set to "0", if the device intends to be the sender of the planned transmission and set to "1", if the device will be a receiver. The Destination/Source DEVID field 703 is set to the DEVID of the communication partner(s). For new streams the StreamID is set to a value that is currently not used for this set of devices. The beacon 105 with the DRP IE 700 is sent in a BP 101 in which the communication partner is beaconing. This last rule is obsolete if there is just one single BP, as in the preferred embodiment of the present invention.

A device that supports implicit DRP negotiation scans all beacons 105 of its own BPs 101 for the occurrence of its DEVID in the Destination/Source DEVID field 704 of all DRP IEs 700. If the Destination/Source DEVID 704 matches the own DEVID, the device checks whether the StreamID 805 is already in use for communication with the sender of the beacon 105. A StreamID 805 that is not in use indicates a new implicit DRP negotiation. The case of implicit DRP negotiation for the purpose of modifying an existing stream is treated like a new implicit DRP negotiation.

An intended receiver of the DRP IE 700 in the beacon 105 evaluates whether the medium is free during the requested time according to the locally stored information. If the medium is free and no own transmission or reception is scheduled during the requested time, the device may take over the DRP IE 700 in its next own beacon 105 with the Tx/Rx bit 801 inverted and the DEVID of the communication partner in the Destination/Source DEVID field 743. Such a DRP IE is interpreted as positive acknowledgement of the implicit DRP initiation.

If an intended receiver of the DRP IE 700 in the initiating beacon 105 cannot accept the implicit request due to conflict with other reservations, it may propose alternative BPST or TBTT Offsets 705 in its DRP IE 700. It may also include a bitmap or a combination of offset and bitmap for this purpose. In the alternative embodiment of the present invention, in which the DRP IE already includes a bitmap no additional bitmap is required. The initiator of the implicit negotiation may accept one of the alternative reservation proposals and include it in its following beacons 105 or may re-initiate the negotiation process with a new reservation proposal. The latter is not required if the responder has included all possible BPST Offsets and durations e.g. in form of a bitmap in its beacon.

The inclusion of all possible reservation times in the beacon of the responders is especially useful in the case of multicast streams in order to allow the sender to find a common time for the reservation. Receivers that cannot be served during the finally chosen reservation period could be served in separate unicast or multicast reservation periods. These reservations need to be set up by separate DRP negotiations.

If an intended receiver of the DRP IE 700 in the initiating beacon 105 finds out that the medium is occupied during the proposed reservation time and if no alternative period can be identified, or if the device is not willing to accept the reservation for any other reasons, it takes over the DRP IE 700 in its next own beacon 105 with the Tx/Rx bit 801 inverted, the DEVID of the communication partner in the Destination/Source DEVID field 704, and the Duration field 706 set to zero. Such a DRP IE 700 with Duration 706 set to zero is interpreted as negative acknowledgement of the implicit DRP initiation. In this case the initiator does not re-initiate the implicit DRP negotiation.

If sender and receiver(s) have successfully negotiated a reservation, they keep the reservation information in their respective beacon frames 105 in the BP 101 of subsequent superframes 100. In an alternative embodiment of the invention only the receiver(s) include the reservation information in their beacon. In a further embodiment the receiver and all its direct (1-hop) neighbor devices include the reservation information in their beacon. In an alternative embodiment, the sender, receiver and all direct (1-hop) neighbors of the sender and receiver include the reservation information in their beacon.

In case that either sender or receiver of a unicast stream or the sender of a multicast stream want to change the reservation, they can initiate a new implicit DRP negotiation. The StreamID 805 of the old stream may be kept. This is the reason why a device that supports implicit DRP negotiation checks all received DRP IEs 700 of its own existing streams for changes in the reservation fields (e.g. Duration 706, BPST or TBTT Offset 705) (and the optional Channel Number field 806). A changed DRP IE 700 is treated like a new implicit DRP initiation.

If a neighbor BP 101 is detected, a DRP IE 700 of type Hard and subtype BP is included in the beacon 105 to protect the neighbor BP 101.

Devices, which receive reservation information in the beacon 105 of another device, store this reservation information locally and defer from any medium access at the announced point in time indicated by the BPST or TBTT Offset field 702 in the DRP IE 700. Only the owner of the reservation is allowed to access the medium at the beginning of a reserved period.

It is possible that two independent sets of devices carry out a DRP negotiation in parallel. In this case reservation collisions can occur, which have to be resolved. If a device receives reservation information for a time in the future, for which the device has reserved the medium itself, the device is only allowed to keep this own reservation if the priority of the device's planned transmission is higher than the priority of the received reservation. In case of equal priorities the reservation of the transmitter device with the lower StreamID prevails. This is why the StreamID is selected randomly. If a device detects that its own reservation is overruled by another device, it cancels its planned transmission and tries to make a new reservation in a subsequent superframe 100. All devices modify their locally stored reservation information, in case that they receive a reservation with a higher priority or lower DEVID for the same or an overlapping time-period.

A DEV terminates a reservation that was initiated by an explicit DRP negotiation by sending the DRP Termination Command. The DRP Termination Command of a unicast stream is acknowledged with an Imm Ack frame (see FIG.

Figure 20:
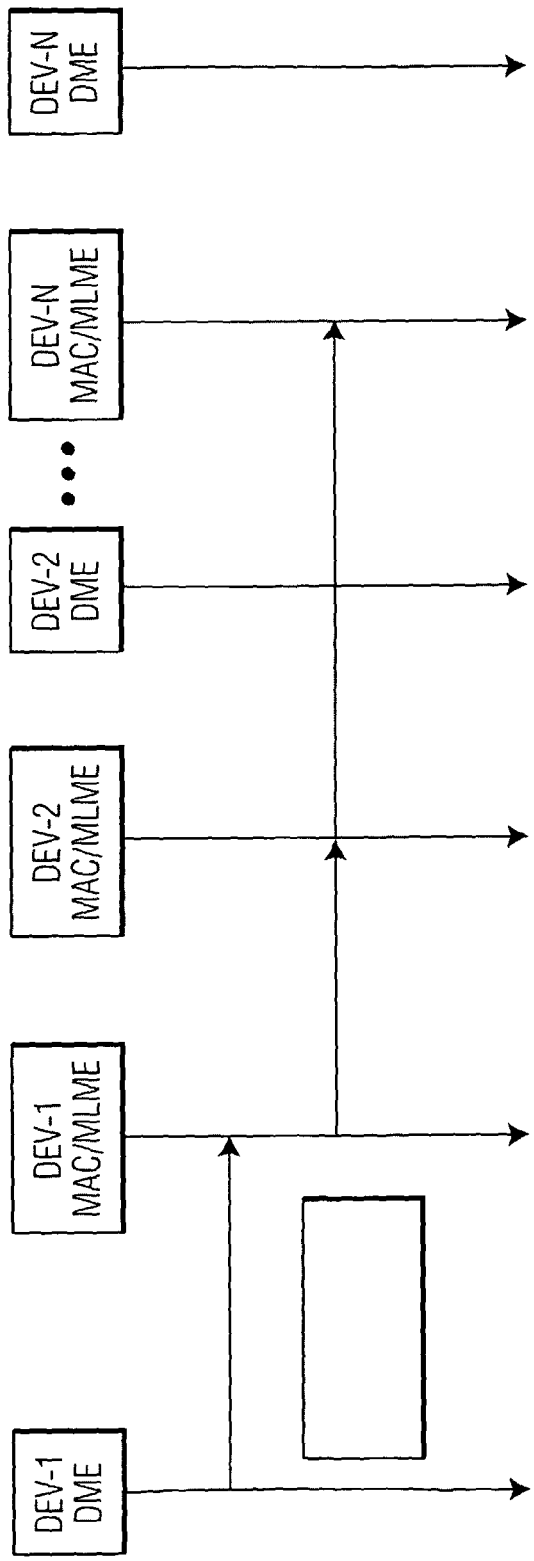
FIG. 20 illustrates an MSC for multicast DRP Termination.

19). The DRP Termination Command does not have to be acknowledged in case of a multicast DRP Termination (see FIG. 20).

In an alternative embodiment of the invention not only the device that terminates the DRP but all devices that had previously broadcast the reservation in their beacon send out a DRP Termination Command.

Streams that were set up by implicit DRP negotiation can be terminated by removing the DRP IE 700 from the beacon 105 or alternatively by setting the Duration field of the DRP IE to zero (or alternatively a bitmap to all zeros) and removing the DRP IE afterwards. A missing DRP IE 700 in a correctly received beacon 105 is interpreted as the termination of the stream. In an alternative embodiment this mechanism can also be used instead of the DRP Termination Command to terminate streams that have been set up by explicit negotiation.

Once the DRP is terminated, all involved DEVs clear the DRP IE 700 from their beacons 105.

If a beacon 105 is received with a missing DRP IE 700, all devices can clear any local information regarding the reservation associated with the missing DRP.

If a DEV does not receive a beacon 105 that included one or more DRP IEs 700 during mMaxLostBeacons consecutive frames, the DEV clears the DRP reserved time(s) announced in that beacon 105.

While the preferred embodiments of the present invention have been illustrated and described, it will be understood by those skilled in the art that the management frame, device architecture and methods as described herein are illustrative and various changes and modifications may be made and equivalents may be substituted for elements thereof without departing from the true scope of the present invention. In addition, many modifications may be made to adapt the teachings of the present invention to a particular situation without departing from its central scope. Therefore, it is intended that the present invention not be limited to the particular embodiments disclosed as the best mode contemplated for carrying out the present invention, but that the present invention include all embodiments falling with the scope of the appended claims.

We claim:

1. A method of decentralized medium access control in a communications network including a plurality of devices, comprising:
    dividing time into a sequence of at least one superframe; and
    a first device of said plurality transmitting in the superframe at a target beacon transmission time (TBTT) a beacon frame that includes a reservation for a planned transmission by a sender device during the superframe.

2. The method of claim 1, wherein:
    said first device is the sender of said planned transmission; and further comprising:
        the sender including the reservation in a beacon frame in all superframes during which the reservation is active, and
        including, by a receiver device of the planned transmission, said reservation in a beacon frame in all superframes during which the reservation is active.

3. The method of claim 1, further comprising grouping the beacon frame transmitted by each of the plurality of devices into the superframe as at least one beacon period having a starting point at a beacon period start time (BPST) and followed by a data transmission phase.

4. The method of claim 1, further comprising prior to a new or a change of an existing reservation of the sender device, the sender device negotiating with a receiver device of the transmission that is planned during the reservation.

5. The method of claim 4, said negotiation comprising
    an initiator device of the reservation transmitting a distributed reservation protocol (DRP)-Request message comprising at least one reservation description selected from the group consisting of
        a starting time, and a duration signaled by means of BPST or TBTT offset,
        a reservation period,
        a bitmap indicating the reserved times,
        at least one time slot number,
        a priority,
        a channel/hopping indicator, and
        a code sequence; and
    in response to said DRP-Request, said negotiation further comprises at least one receiver device of the reservation transmitting a distributed reservation protocol (DRP)-Response message that includes an indicator selected from the group consisting of the proposed reservation is accepted, the proposed reservation is rejected with an alternative reservation proposal and the proposed reservation is rejected without an alternative proposal.

6. The method of claim 5, wherein the negotiation further comprises said at least one receiver device further including in said DRP-Response one of the items selected from the group consisting of at least one alternative available time proposal for the reservation and information of at least one alternative available time during the superframe.

7. The method of claim 1, further comprising including in the beacon frame of the first device a starting time of the reservation relative to a reference point selected from the group consisting of the TBTT of the first device, the BPST of the beacon period in which the first device is transmitting the beacon frame, the beginning of the superframe, a time period of the superframe, and a time slot of the superframe.

8. The method of claim 7, wherein:
    the starting time of the reservation is given relative to said reference point in the next following superframe, in which said first device will transmit its next beacon frame; and
    if proposed by the receiver device, the at least one alternative available time for the reservation is given relative to a reference point in the next following superframe, in which said receiver device will transmit its next beacon frame.

9. The method of claim 1, further comprising maintaining by each device of said plurality of devices a table of all planned reservations received or sent by the device.

10. The method of claim 1, further comprising:
    a receiver device of said reservation sending a poll packet to the sender device;
    upon receipt of the poll packet, the sender device sending at least one data packet to the receiver device; and
    the receiver device acknowledging receipt of at least one data packet by transmitting an acknowledgement (ACK) packet.

11. The method of claim 1, further comprising:
    defining said superframe as comprising a plurality of medium access time slots; and
    defining a reservation as a starting time slot of said plurality of medium access time slots and a duration as a number of medium access time slots.

12. The method of claim 1, further comprising:
    defining said superframe as comprising a plurality of medium access time slots; and defining a reservation as a starting time in time units and a duration as a number of time units.

13. The method of claim 1, further comprising:
defining said superframe as comprising a plurality of medium access time slots; and
defining a reservation as at least one bit in a bitmap comprising at least one bit per each medium access time slot of said plurality of medium access time slots.

14. The method of claim 1, further comprising:
defining said superframe as comprising a plurality of medium access time slots; and
defining a reservation as at least one element selected from the group consisting of a reservation period, a reservation offset, a reservation period offset, a reservation duration, a bitmap of at least one medium access time slot and a type of reservation.

15. The method of claim 1 further comprising defining a reservation as one element selected from the group consisting of:
a plurality of reservations per superframe and valid for a single superframe,
a plurality of reservations per superframe and valid for a plurality of superframes,
single reservation per superframe and valid for a single superframe, and
single reservation per superframe and valid for a plurality of superframes.

16. The method of claim 6, wherein said at least one alternative available time for the reservation is signaled by means of an availability bitmap having at least one bit per time slot to indicate the availability of the time slot.

17. The method of claim 6, wherein said at least one alternative available time for the reservation is signaled by means of at least one element selected from the group consisting of reservation period, reservation offset, reservation period offset, reservation duration, bitmap having at least one bit per time slot to indicate the availability of the time slot.

18. The method of claim 2, further comprising implicitly negotiating the reservation using a first beacon frame of the sender device and a first beacon frame of the receiver device.

19. The method of claim 1, further comprising including availability information in a beacon frame of a device.

20. The method of claim 5, further comprising the initiator device completing the negotiation with a transmission of a DRP Complete message.

21. The method of claim 5, further comprising the sender device terminating the reservation.

22. The method of claim 21, further comprising the sender device terminating a reservation that was initiated by an explicit negotiation, by transmission of a termination command.

23. The method of claim 22, further comprising the receiver device acknowledging the termination command of a unicast stream by transmission of an Immediate Acknowledgment (Imm ACK) frame.

24. The method of claim 22, further comprising sending a termination command by all devices that had previously included the reservation in a beacon frame.

25. The method of claim 2, wherein the beacon frame of the transmitting and including steps comprises a distributed reservation protocol (DRP) information element (IE) that includes information regarding the position of at least one reservation in the superframe.

26. The method of claim 22, further comprising terminating a reservation by performing one selected from the group consisting of:

removing the reservation information element IE from a current beacon frame and all subsequent beacon frames, and
setting the duration field of the reservation information element IE to zero in a current beacon frame and removing the reservation information element IE from subsequent beacon frames.

27. The method of claim 1, wherein:
the transmitting step includes in the beacon frame information of a reservation selected from the group consisting of a starting point and duration, and a bitmap; and
the including is optional.

28. The method of claim 1, further comprising respecting the reservation by all devices receiving a beacon frame that includes the reservation.

29. The method of claim 1, further comprising:
including information on a direction of the planned transmission in the beacon frame; and
only devices within a transmission range of a receiver device respecting the reservation, in case of a unidirectional planned transmission.

30. The method of claim 25, wherein only the receiver device performs the including to include the reservation information element IE in the beacon frame.

31. The method of claim 25, wherein only receiver devices and all 1-hop neighbor devices of receiver devices perform the including to include the reservation information element IE in the beacon frame.

32. The method of claim 25, wherein the sender device, receiver devices, and all 1-hop neighbor devices of the sender device and receiver devices perform the including to include the reservation information element IE in a beacon frame.

33. The method of claim 27, further comprising the receiver device of a reservation performing:
in case of a Soft Reservation, starting an own transmission if the sender device does not use the reserved time;
in case of a Hard Reservation, not accessing the medium if the sender device of the planned transmission does not use the reserved time; and
in case of a Beacon Period Reservation, reserving the time for beacon transmission only.

34. A wireless device that reserves a medium in a distributed manner, comprising:
an antenna for sending and receiving messages over a wireless medium;
a receiver coupled to the antenna to receive messages transmitted over the wireless medium;
a transmitter coupled to the antenna to transmit messages over the wireless medium;
a distributed reservation processing module to perform distributed reservation of the medium;
a processor to divide time into a sequence of at least one superframe, each said superframe having at least one beacon period that starts at a target Beacon Period Start Time (BPST) and includes at least one beacon slot, said beacon period being followed in the superframe by a data transmission phase, and coupled to:
the transmitter and the receiver to send and receive, respectively, beacon frames during said beacon period and data during said data transmission phase of the superframe,
the distributed reservation processing module to
manage beacon slot occupancy and data transmission phase reservations;
format a beacon frame for transmission in the at least one beacon slot, such that the beacon frame includes a reservation of the medium by the device for data transmission during the data transmission phase, and format a beacon frame for transmission in the at least one beacon slot that responds to reservations received over the medium.

35. The wireless device of claim 34, wherein:

each superframe further comprises a plurality of medium access slots allocated between said beacon period and said data transmission phase;

and further comprising
- a bitmap operably connected to said processor and arranged to have at least one bit that corresponds to a slot of said plurality of medium access slots, and
- a memory operably connected to said processor and arranged to store a reservation table of all planned reservations received or sent by the device; and said distributed reservation protocol (DRP) processing module further configured to
- set and reset said at least one bit of said bitmap in accordance with reservations of the medium for data transmission and beacon slot occupancy, and
- store and delete reservations sent and received by the device in the reservation table of the memory.

36. A wireless device for distributed reservation of a medium, comprising:
- an antenna for sending and receiving messages over a wireless medium;
- a receiver coupled to the antenna to receive medium reservation messages transmitted over the wireless medium;
- a transmitter operatively coupled to the antenna to transmit medium reservation messages over the wireless medium;
- a distributed reservation processing module to perform distributed reservation of the medium; and
- a processor coupled to the distributed reservation processing module, a distributed reservation protocol (DRP) bitmap, and a memory including a DRP reservation table, said processor using the distributed reservation processing module, the DRP bitmap, and the DRP reservation table to divide time into a sequence of at least one superframe, and transmitting in the superframe at a target beacon transmission time (TBTT) a beacon frame that includes a reservation for a planned transmission by a sender device during the superframe.

* * * * *